(12) United States Patent
Wang et al.

(10) Patent No.: US 8,625,060 B2
(45) Date of Patent: Jan. 7, 2014

(54) REFLECTIVE DISPLAY APPARATUS

(75) Inventors: Yi-Ching Wang, Hsinchu (TW);
Yuan-Chih Tsai, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 153 days.

(21) Appl. No.: 13/106,968

(22) Filed: May 13, 2011

(65) Prior Publication Data

US 2012/0081650 A1    Apr. 5, 2012

(30) Foreign Application Priority Data

Sep. 30, 2010    (TW) ................................ 99133322 A

(51) Int. Cl.
*G02F 1/1335* (2006.01)
(52) U.S. Cl.
USPC .......................................................... 349/113
(58) Field of Classification Search
USPC .......................................................... 349/113
See application file for complete search history.

(56) References Cited

U.S. PATENT DOCUMENTS

2005/0280635 A1 * 12/2005 Hinata .......................... 345/173

FOREIGN PATENT DOCUMENTS

| CN | 1713212 | 12/2005 |
|---|---|---|
| TW | 200604949 A | 2/2006 |
| TW | 200745637 A | 12/2007 |
| TW | 200837408 A | 9/2008 |
| TW | 201013241 A | 4/2010 |

OTHER PUBLICATIONS

Taiwan Patent Office, "Office Action", Aug. 15, 2013.
China Patent Office, "Office Action", Jul. 2, 2013.

\* cited by examiner

*Primary Examiner* — Phu Vu
(74) *Attorney, Agent, or Firm* — WAPT, PC; Justin King

(57) ABSTRACT

A reflective display apparatus includes a transparent substrate, a reflective substrate, a display layer and a transparent gluing layer. The transparent gluing layer is disposed between the transparent substrate and the display layer and the refractive indices of the transparent gluing layer and of the transparent substrate are substantially the same. Therefore, the energy loss of light can be reduced at the interface between the transparent gluing layer and the transparent substrate, so the brightness of the image displayed by the reflective display apparatus may be increased.

9 Claims, 1 Drawing Sheet

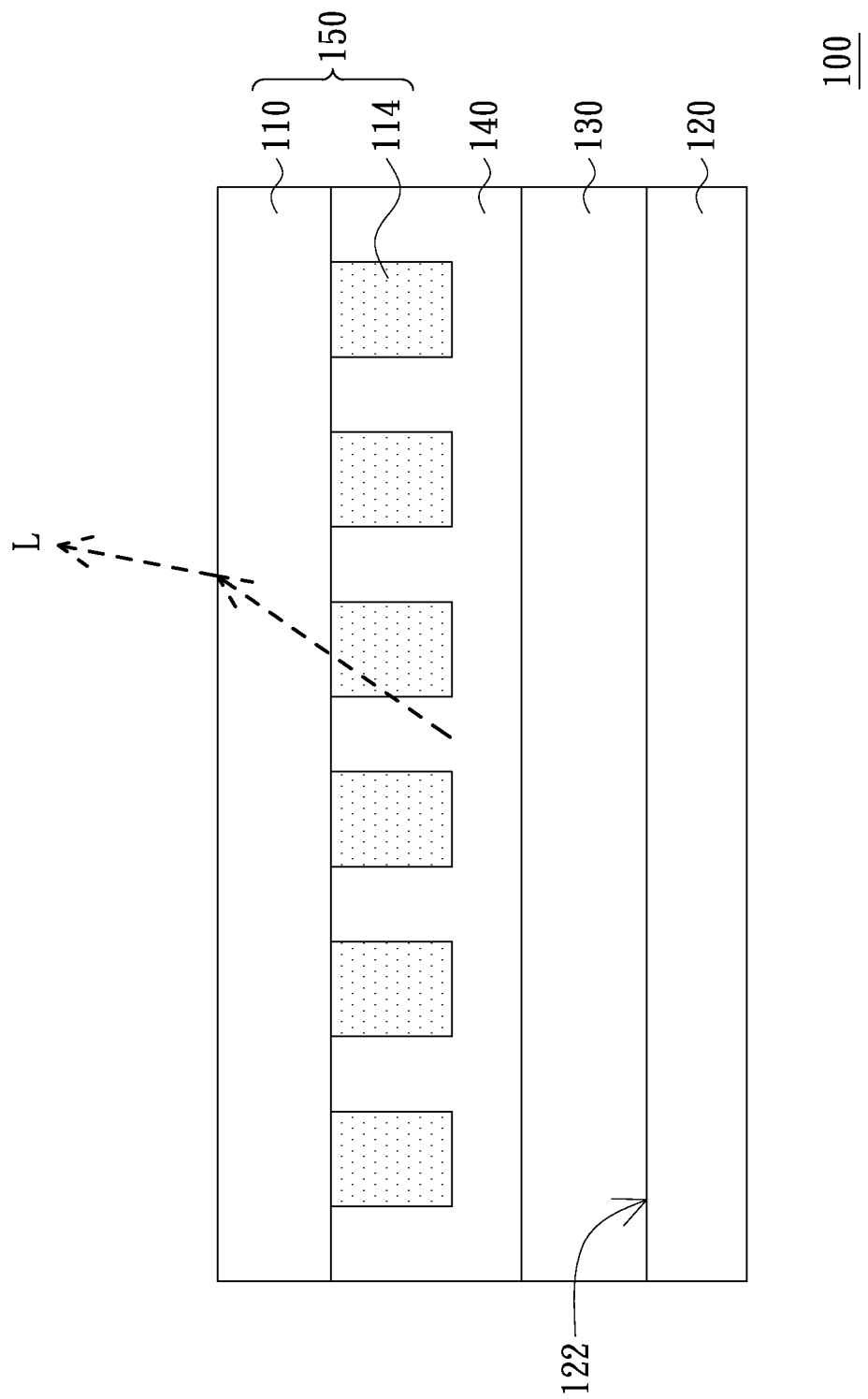

REFLECTIVE DISPLAY APPARATUS

FIELD OF THE INVENTION

The present invention relates to a reflective display apparatus, and more particularly to a reflective display apparatus with excellent light exitance rate.

BACKGROUND OF THE INVENTION

As compared to conventional display apparatus, reflective display apparatus is of energy saving due to it is capable of utilizing environment light as light source to display image.

The quality of the image displayed by the reflective display apparatus is greatly influenced by brightness of the light reflected by the reflective display apparatus. If the environment light is brighter and the light utilization rate of the reflective display apparatus is greater, the image displayed by the reflective display apparatus may be clearer. However, when the light enters a medium from another medium, the energy loss (Fresnel Loss) will be generated at the interface between the mediums because of light refraction. For example, when the light enters glass from air, the refractive indices at the interface is in the range about 7-8%. Therefore, how to reduce the energy loss rate of the light inside the reflective display apparatus to optimize the utilization rate of incident light is concerned by industry participants.

SUMMARY OF THE INVENTION

The present invention provides a reflective display apparatus with low energy loss and excellent light exitance rate.

In order to achieve the above-mentioned advantages, the present invention provides a reflective display apparatus includes a reflective substrate, a transparent substrate, a display layer and a transparent gluing layer. The display layer is disposed on the reflective substrate. The transparent substrate is disposed on the display layer. The transparent gluing layer is disposed between the transparent substrate and the display layer and the refractive indices of the transparent gluing layer and that of the transparent substrate are substantially the same.

In one embodiment of the present invention, the display layer is a liquid crystal layer, an electrowetting display layer or an electrophoretic display layer, such as a microcapsule electrophoretic display layer, a microcup electrophoretic display layer, or microgroove electrophoretic display layer.

In one embodiment of the present invention, the reflective display apparatus further includes a plurality of color filter films formed on the transparent substrate and located between the transparent substrate and the display layer.

In one embodiment of the present invention, the refractive index of the transparent gluing layer is no less than 1.4 and no more than 1.7.

In one embodiment of the present invention, material of the transparent gluing layer is epoxy, acrylic or silicone.

In one embodiment of the present invention, the transparent substrate is a touch panel.

In the reflective display apparatus of the present invention, the transparent gluing layer with substantially the same refractive index as the transparent substrate is disposed between the transparent substrate and the display layer. Therefore, the energy loss of light can be reduced when light exits from the reflective display apparatus, so the brightness of the image displayed by the reflective display apparatus may be increased.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 1 is a schematic, cross sectional view of a reflective display apparatus according to an embodiment of the present invention.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Referring to FIG. 1, a reflective display apparatus 100 according to an embodiment of the present invention includes a transparent substrate 110, a reflective substrate 120, a display layer 130 and a transparent gluing layer 140. The display layer 130 is disposed on the reflective substrate 120. The transparent substrate 110 is disposed on the display layer 130. The transparent gluing layer 140 is disposed between the transparent substrate 110 and the display layer 130. More concretely, the reflective substrate 120 includes, for example, a plurality of pixel units (not shown), and each of the pixel units has a reflective surface 122, the display layer 130 is disposed on and covers the reflective surface 122. In this embodiment, the display layer 130 may be, but not limited to, a liquid crystal layer. In other embodiments, the display layer 130 may be an electrophoretic display layer, such as a microcup electrophoretic display layer, a microcapsule electrophoretic display layer, or a microgroove electrophoretic display layer. Alternatively, the display layer 130 may be an electrowetting display layer.

More specially, the refractive indices of the transparent gluing layer 140 and that of the transparent substrate 110 are substantially the same. Therefore, the energy loss of the light L reflected by the reflective substrate 120 can be reduced at the interface between the transparent gluing layer 110 and the transparent substrate 140. In this embodiment, the refractive index of the transparent gluing layer 140 is in the range of about 1.4 to 1.7, and 1.5 is preferred. Material of the transparent gluing layer 140 may be epoxy, acrylic or silicone. More concretely, the transparent gluing layer 140 may be a sheet or be formed by curing liquid material.

Also referring to FIG. 1, in this embodiment, the transparent substrate 110 includes, for example, a plurality of color filter films 114 thereon. More concretely, the color filter films 114 may be red filter films, blue filer films and green filter films. That is to say, the display layer 130 is configured with a color filter 150 thereon, and the color filter 150 is composed of the color filter films 114 and the transparent substrate 110.

In other embodiments, the transparent substrate 110 may be, but not limited to, a touch panel.

As mentioned above, in the reflective display apparatus of the present invention, the transparent gluing layer 140 with substantially the same refractive index as the transparent substrate 110 is disposed between the transparent substrate 110 and the display layer 130. Therefore, the energy loss of the light can be reduced when light exits from the reflective display apparatus, so the brightness of the image displayed by the reflective display apparatus may be increased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A reflective display apparatus, comprising:
a reflective substrate;
a display layer disposed on the reflective substrate;
at least a transparent substrate disposed on the display layer; and
a transparent gluing layer disposed between the transparent substrate and the display layer, and the transparent gluing layer being contacted to the display layer directly, wherein a refractive index of the transparent gluing layer and a refractive index of the transparent substrate are substantially the same.

2. The reflective display apparatus according to claim 1, wherein the display layer is a liquid crystal layer, an electrowetting display layer or an electrophoretic display layer.

3. The reflective display apparatus according to claim 2, wherein the electrophoretic display layer includes a microcapsule electrophoretic display layer, a microcup electrophoretic display layer, or a microgroove electrophoretic display layer.

4. The reflective display apparatus according to claim 1 further comprising a plurality of color filter films formed on the transparent substrate and located between the transparent substrate and the display layer.

5. The reflective display apparatus according to claim 1, wherein the refractive index of the transparent gluing layer is no less than 1.4 and no more than 1.7.

6. The reflective display apparatus according to claim 1, wherein material of the transparent gluing layer is epoxy, acrylic or silicone.

7. The reflective display apparatus according to claim 1, wherein the transparent substrate is a touch panel.

8. The reflective display apparatus according to claim 4, wherein the transparent gluing layer is contacted to the color filter films.

9. The reflective display apparatus according to claim 1, wherein the reflective substrate comprises a plurality of pixel units, and each of the pixel units has a reflective surface.

* * * * *